US011620266B2

(12) United States Patent
Nadimpalli et al.

(10) Patent No.: US 11,620,266 B2
(45) Date of Patent: Apr. 4, 2023

(54) DATA STORE TRANSITION USING A DATA MIGRATION SERVER

(71) Applicant: PAYPAL, INC., San Jose, CA (US)

(72) Inventors: Venkata Ramana Nadimpalli, Fremont, CA (US); Vahini Pobbathi, San Jose, CA (US); Ming Zhu, Fremont, CA (US); Jinwoo Lee, Campbell, CA (US); Yuehao Wu, San Jose, CA (US); Harish Ghanashyam Nalagandla, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/499,185

(22) Filed: Oct. 12, 2021

(65) Prior Publication Data

US 2022/0043785 A1 Feb. 10, 2022

Related U.S. Application Data

(63) Continuation of application No. 16/457,812, filed on Jun. 28, 2019, now Pat. No. 11,144,517.

(51) Int. Cl.
*G06F 16/21* (2019.01)
*G06F 16/27* (2019.01)
*G06F 3/06* (2006.01)

(52) U.S. Cl.
CPC .......... *G06F 16/214* (2019.01); *G06F 3/0607* (2013.01); *G06F 3/067* (2013.01); *G06F 3/0647* (2013.01); *G06F 16/27* (2019.01)

(58) Field of Classification Search
CPC ....... G06F 16/214; G06F 16/27; G06F 3/0607
See application file for complete search history.

(56) References Cited

U.S. PATENT DOCUMENTS 4,887,204 A * 12/1989 Johnson ................ G06F 16/172
709/219
5,367,698 A * 11/1994 Webber ................ G06F 16/119
709/219

(Continued)

OTHER PUBLICATIONS

OGG., "Understanding Oracle GoldenGate", Introduction to Oracle GoldenGate, Retrieved from Internet URL: https://docs.oracle.com/en/middleware/goldengate/core/19.1/understanding, Jun. 28, 2019, 4 pages.

(Continued)

*Primary Examiner* — Eliyah S. Harper
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to transitioning between data stores using a data migration server. In some embodiments, the data migration server may be used to access data stored on a preexisting data store to service requests from a plurality of services. A dual-write operation mode for the data migration server may then be enabled such that, in response to a given write request, the data migration server writes a given data entry to both the preexisting data store and a replacement data store. Further, a dual-read operation mode may be enabled such that, in response to a given read request, the data migration server reads a corresponding data entry from both the preexisting and replacement data stores. Configuration settings for the data migration server may then be adjusted to designate the replacement data store as the primary data store to service requests from the services.

20 Claims, 10 Drawing Sheets

(56) References Cited

U.S. PATENT DOCUMENTS

| | | | |
|---|---|---|---|
| 6,269,382 B1* | 7/2001 | Cabrera | G06F 16/122 |
| 7,386,552 B2* | 6/2008 | Kitamura | G06F 16/10 |
| | | | 709/219 |
| 7,467,282 B2* | 12/2008 | Rao | G06F 3/0607 |
| | | | 711/170 |
| 8,645,645 B2* | 2/2014 | Kamei | G06F 3/0619 |
| | | | 711/161 |
| 10,083,199 B1 | 9/2018 | Sharma et al. | |
| 2005/0256898 A1* | 11/2005 | Akagawa | G06F 16/119 |
| | | | 707/999.102 |
| 2007/0055703 A1* | 3/2007 | Zimran | H04L 67/565 |
| 2007/0088702 A1 | 4/2007 | Fridella et al. | |
| 2007/0185938 A1* | 8/2007 | Prahlad | G06F 3/0653 |
| 2012/0150799 A1 | 6/2012 | Matsuzawa | |
| 2013/0013565 A1* | 1/2013 | Oza | G06F 11/1451 |
| | | | 707/E17.007 |
| 2017/0351702 A1* | 12/2017 | Schaefer | G06F 16/27 |
| 2020/0387498 A1 | 12/2020 | Sundelin et al. | |

OTHER PUBLICATIONS

OIS., "Overview of Oracle Integration Server", Oracle8i Integration Server Overview, Release 3 (8.1.17), Part No. A83729-01, Retrieved from Internet URL: https://docs.oracle.com/cdA87860_01/doc/ois.817/a83729/adois03.html, Retrieved on Jun. 28, 2019, 15 pages.

Oracle., "Using Oracle Commerce Cloud", Oracle, Commerce Cloud, Feb. 27, 2018, 218 pages.

Yarn., "The Yarn Timeline Service v.2," Apache Hadoop 2.9.2, Retrieved from Internet URL: https://hadoop.apache.org/docs/stable/hadoop-yarn/hadoop-yarn-site/Time, Retrieved on Jun. 28, 2019, 25 pages.

* cited by examiner

DATA STORE TRANSITION USING A DATA MIGRATION SERVER

CROSS REFERENCE TO RELATED APPLICATION

This application is a continuation of U.S. patent application Ser. No. 16/457,812 filed on Jun. 28, 2019 which issued as U.S. Pat. No. 11,144,517 on Oct. 12, 2021, the contents of which are hereby incorporated by reference in their entirety for all purposes.

BACKGROUND

Technical Field

This disclosure relates generally to server computer systems and, more particularly, to transitioning between data stores for a server computer system using a data migration server.

Description of the Related Art

Server systems, such as web servers, application servers, email servers, etc., may provide various computing resources and services to an end user. For example, a server system may be used to provide access to one or more web services to remote users via one or more networks. A server system will commonly maintain one or more data stores, such as a database, to use as a data store for the users and the services. In the course of providing the services, the server system will perform various data-access operations using the one or more data stores. In various instances, however, it may be necessary or desirable to transition from a preexisting "legacy" data store to a new data store. Transitioning between data stores presents various technical challenges, however, such as minimizing service interruption during the transition and ensuring data quality in the new data store.

DETAILED DESCRIPTION

Server systems, such as web servers, application servers, email servers, etc., may provide various computing resources and services to an end user. For example, a server system may be used to provide access to one or more web services to remote users via one or more networks. A server system will commonly maintain one or more data stores, such as a database, to use as a data store for the users and the services. In the course of providing the services, the server system will perform various data-access operations using the one or more data stores. For example, when a new user enrolls in the service, the server system may create new entries in one or more databases to store the user's account information.

In various instances, however, it may be necessary or desirable to transition from a preexisting "legacy" data store to a new data store. For example, as data storage technology improves, it may be desirable to upgrade to a newer data storage system to better support the various web services. Transitioning between data stores presents various technical challenges, however. For example, to transition from the preexisting data store to the replacement data store, all (or most) data stored on the preexisting data store may need to be migrated to the replacement data store, in many instances. For large web services, this may entail copying a large amount of data (e.g., hundreds of millions of data entries) from one data store to the next, which may require a significant amount of time to complete. Additionally, making such a data store transition typically requires an interruption in the availability of the web service(s) that rely on the preexisting data store.

Thus, prior techniques for transitioning between data stores for a server system are often time-intensive processes that involve (potentially extended) service-interruptions, thereby degrading the user experience. In various embodiments, however, the disclosed systems and methods may address these or other technical problems by transitioning between data stores in a way that ensures reliable data migration while mitigating service interruption, as explained in more detail below.

Figure 1:
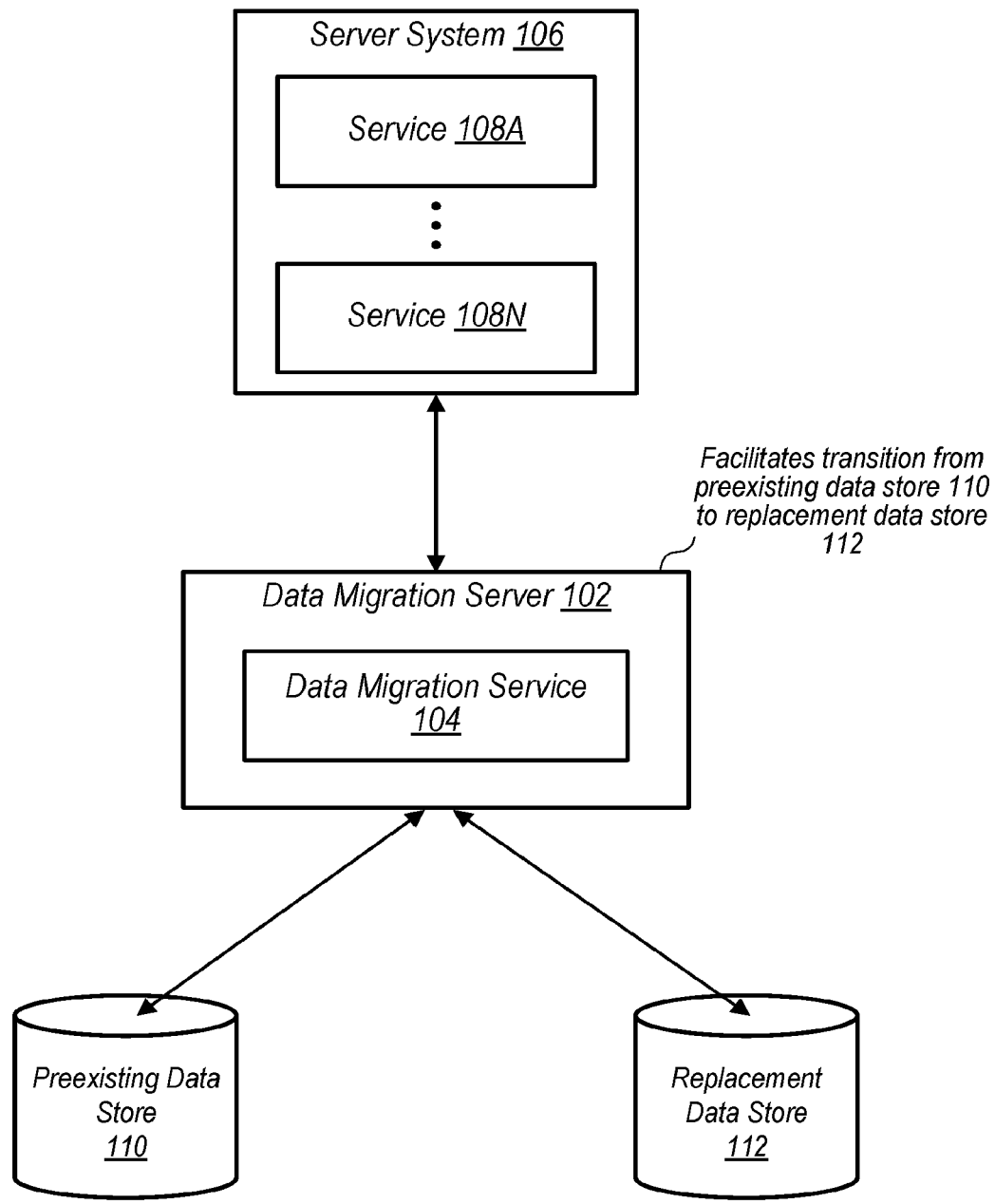
FIG. 1 is a block diagram illustrating an example system 100 in which a data migration server is used to transition from a preexisting data store to a replacement data store used to support one or more services, according to some embodiments.

Referring now to FIG. 1, a block diagram illustrating a system 100 for transitioning between data stores using a data migration server is shown, according to some embodiments. In the embodiment of FIG. 1, system 100 includes data migration server 102, server system 106 (being used to host various web services 108), preexisting data store 110, and replacement data store 112. Note that, although shown in direct connection, one or more of server system 106, data migration server 102, preexisting data store 110, and replacement data store 112 may be connected via one or more communication networks (not shown for clarity).

In various embodiments, server system 106 may host various web services 108A-N accessible to various remote users via one or more communication networks. For example, in various embodiments, server system 106 may host an email service, streaming service, online payment service, or any other suitable web service 108. A given service 108 may provide various functionalities to users with valid user accounts. For example, in an embodiment in which service 108A is an online payment service, it may provide end users having valid user account with various functionalities, such as sending and receiving online money transfers, viewing financial statements, etc. Note, however, that this embodiment is provided merely as an example and is not intended to limit the scope of the present disclosure. In other embodiments, the disclosed systems and methods may be implemented in the context of any other suitable web service 108. Further note that although only one server system 106 is shown in FIG. 1, in other embodiments, any suitable number of server systems 106 may be used to host the services 108A-108 N.

FIG. 1 further depicts data migration server 102, which hosts data migration service 104. As described in more detail herein, data migration service 104, in various embodiments, is operable to facilitate the transition from preexisting data store 110 to replacement data store 112 as the primary data store for one or more of the services 108. For example, as described in more detail below with reference to FIG. 2A, prior to transitioning to the replacement data store 112, server system 106 may use the preexisting data store 110 is the primary data store for services 108. In such a configuration, when a given service 108A needs to perform a data-access operation, such as creating or updating a data entry associated with the user of the service, the service 108A may make a data-access request directly to the preexisting data store 110. In various embodiments, the disclosed systems and methods use the data migration server 102 and the data migration service 104 as an intermediary between the services 108 and the data store such that, rather than sending a data-access request directly to the preexisting data store 110, the services 108 instead send these data-access requests to the data migration server 102. The data migration server 102 may then, in various embodiments, service the data-access requests while simultaneously facilitating the transition from preexisting data store 110 to replacement data store 112, as described in more detail below with reference to FIGS. 2A-2H. Once the transition is complete, the preexisting data store 110 may be decommissioned such that it is no longer relied on as the data store for the services 108.

Thus, in various embodiments, the disclosed techniques allow for the transition between data stores to be performed "in the background" with little to no interruption in the availability of services 108. Further, as described in more detail below with reference to FIG. 2E, the disclosed techniques, in various embodiments, include various data verification operations to ensure data quality during the transition from one data store to the next. Accordingly, the disclosed systems and methods facilitate the efficient and reliable transition from one data storage system to the next in a way that minimizes service interruptions, thereby improving the data migration process and the functioning of system 100 as a whole.

FIGS. 2A-2H depict a series of block diagrams illustrating various stages in the process of transitioning from preexisting data store 110 to replacement data store 112 as the primary data store for one or more of the services 108, according to various embodiments.

Figure 2A:
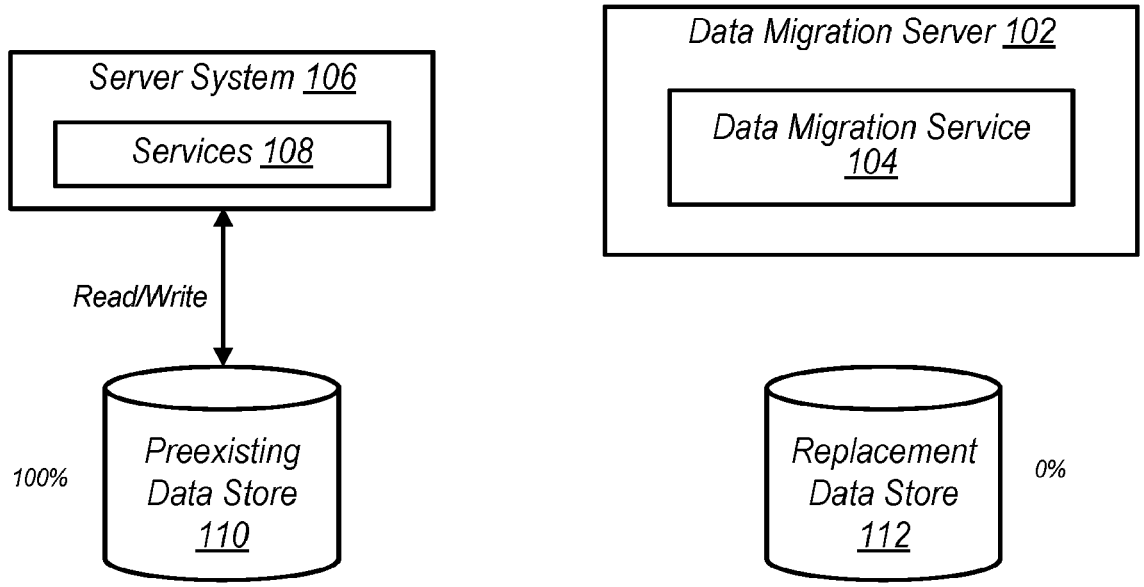
FIGS. 2A-2H depict a series of block diagrams illustrating stages in the process of transitioning from a preexisting data store to a replacement data store, according to some embodiments.

In FIG. 2A, block diagram 200 illustrates an initial state of the server system 106, services 108, and the preexisting data store 110 prior to the transition to replacement store 112, according to some embodiments. As shown in FIG. 2A, during this initial state, the various services 108 may access the preexisting data store 110 directly. That is, the server system 106 may read data from and write data to the preexisting data store 110 to service data-access requests for the various services 108. For example, a particular service 108C may receive a request from a remote user (not shown, for clarity) to retrieve an item of data. In response to this request, the service 108C may send a read request to the preexisting data store 110, which may then return the requested item of data for the service 108C. Note that, in various embodiments, services 108 may include many (e.g., hundreds, thousands, etc.) of different web services hosted by one or more server systems 106. Further note that, in various embodiments, these services may be written using any one or more suitable programming languages, such as C++, Java, etc.

Figure 2B:
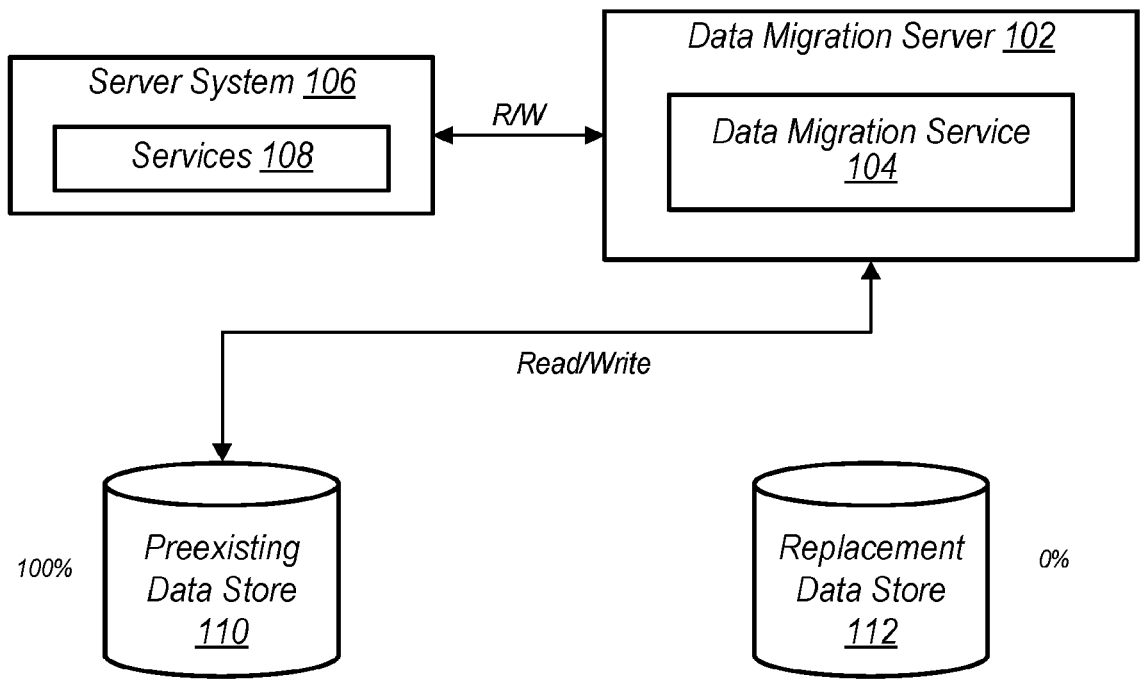

In FIG. 2B, data migration server 102 has been introduced as an intermediary such that all data-access traffic from the services 108 to the preexisting data store 110 are routed through the data migration server 102. That is, in the embodiment of FIG. 2B, the data-access layer for the services 108 has been modified from a direct call to the preexisting data store 110 (as shown in FIG. 2A) to a service call to the data migration server 102. As shown in FIG. 2B, the data migration server 102 is configured to access data stored on the preexisting data store 110 to service request from the various services 108. In FIG. 2B, the preexisting data store 110 is still being used as the primary data store for the services 108.

Figure 2C:
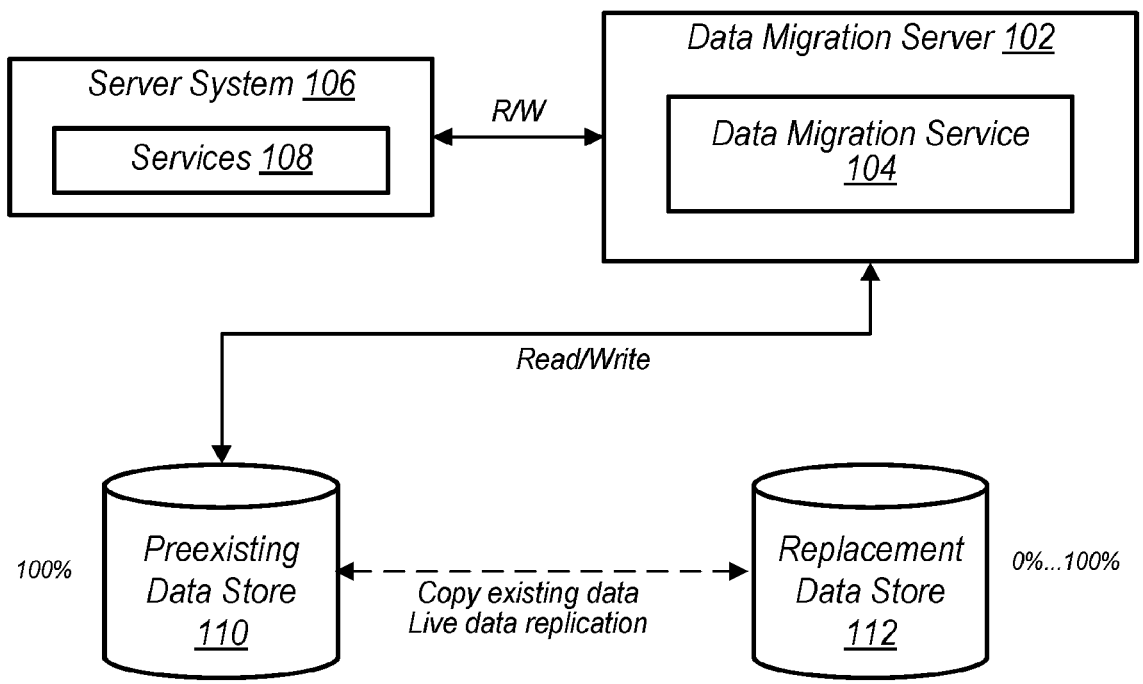

In FIG. 2C, block diagram 220 illustrates a data replication process in which data stored in the preexisting data store 110 is replicated to the replacement data store 112. That is, the data stored in the preexisting data store 110 may be copied to the replacement data store 112 such that, upon completion of this data replication process depicted in FIG. 2C, the replacement data store 112 includes a replication (either complete or partial) of the data stored in the preexisting data store 110. In various embodiments, while this data replication process is being performed, preexisting data store 110 is still being used to service data-access requests from the data migration server 102 for the various services 108. As mentioned above, replacement data store 112 may be any of various suitable data storage systems. As one non-limiting example, the replacement data store 112 may be implemented as a sharded database system that includes multiple database shards, according to some embodiments. Although indicated in FIG. 2C as a single data store for convenience, in various embodiments, replacement data store 112 may be implemented using multiple physically or logically separate data stores. For example, in some embodiments in which the replacement data store 112 is a sharded database system, one or more of the database shards may be implemented on separate database server instances or on separate database server systems.

Accordingly, none of the services 108 are required to be interrupted while this data replication process is performed, according to various embodiments. Note that, as the services 108 are not interrupted, data-access operations are being performed at the same time that data is being replicated from the preexisting data store 110 to the replacement data store 112. For example, while the data replication is taking place, new data entries are being created and existing data entries are being edited and deleted on the preexisting data store 110. To ensure that this data is properly replicated in the replacement data store 112, various disclosed embodiments include performing live data replication to the replacement data store 112 for changes made to the preexisting data store 110 during the data migration process. Various suitable services may be used to perform this data replication from the preexisting data store 110 to the replacement data store 112, according to various embodiments. For example, in some embodiments, the Oracle™ GoldenGate replication service may be used to perform some or all of this data replication process. Note that although there may be some delay (e.g., 10-15 seconds) associated with copying live data written to the preexisting data store 110 to the replacement data store 112 using such a replication service, in various instances such a service will help to ensure consistent data between the two data stores 110 and 112. Additionally note that this embodiment is provided merely as an example and is not intended to limit the scope of the present disclosure. In other embodiments, various other suitable data replication services or techniques may be used.

Further note that, in some embodiments, it may be necessary to perform one or more transformations to the format of the data as it is replicated to the replacement data store 112. For example, in some embodiments, the replacement data store 112 may utilize a different underlying data format to store data than the preexisting data store 110. In such embodiments, this data replication process may include performing any necessary modifications to the data as it is migrated to the replacement data store 112.

Figure 2D:
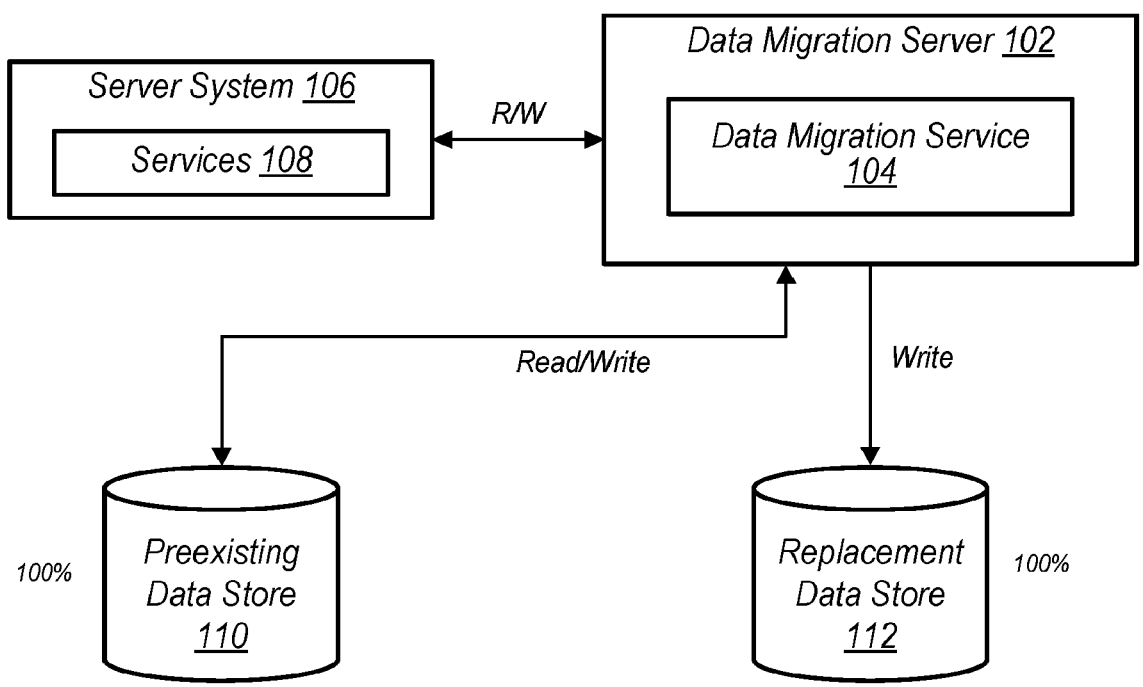

FIG. 2D depicts a block diagram 230 in which the data migration server 102 has been placed in a dual-write operation mode. While in this dual-write operation mode, the data migration server 102 is operable to write data, from the various services 108, to both the preexisting data store 110 and the replacement data store 112. For example, in response to a write request from a particular service 108D, the data migration server 102 may write the relevant data to both the preexisting data store 110 and the replacement data store 112. In various embodiments, the preexisting data store 110 is still used as the primary data store used service data-access requests for the services 108 at this stage in the data store transition process. Stated differently, while the data migration server 102 writes data to both the preexisting data store 110 and the replacement data store 112, it only reads data from the preexisting data store 110, not the replacement data store 112, and it returns the data read from the preexisting data store 110 to the requesting service(s) 108. For example, if a given service 108E sends a read request to the data migration server 102, that read request would be serviced from the preexisting data store 110, according to various embodiments.

Figure 2E:
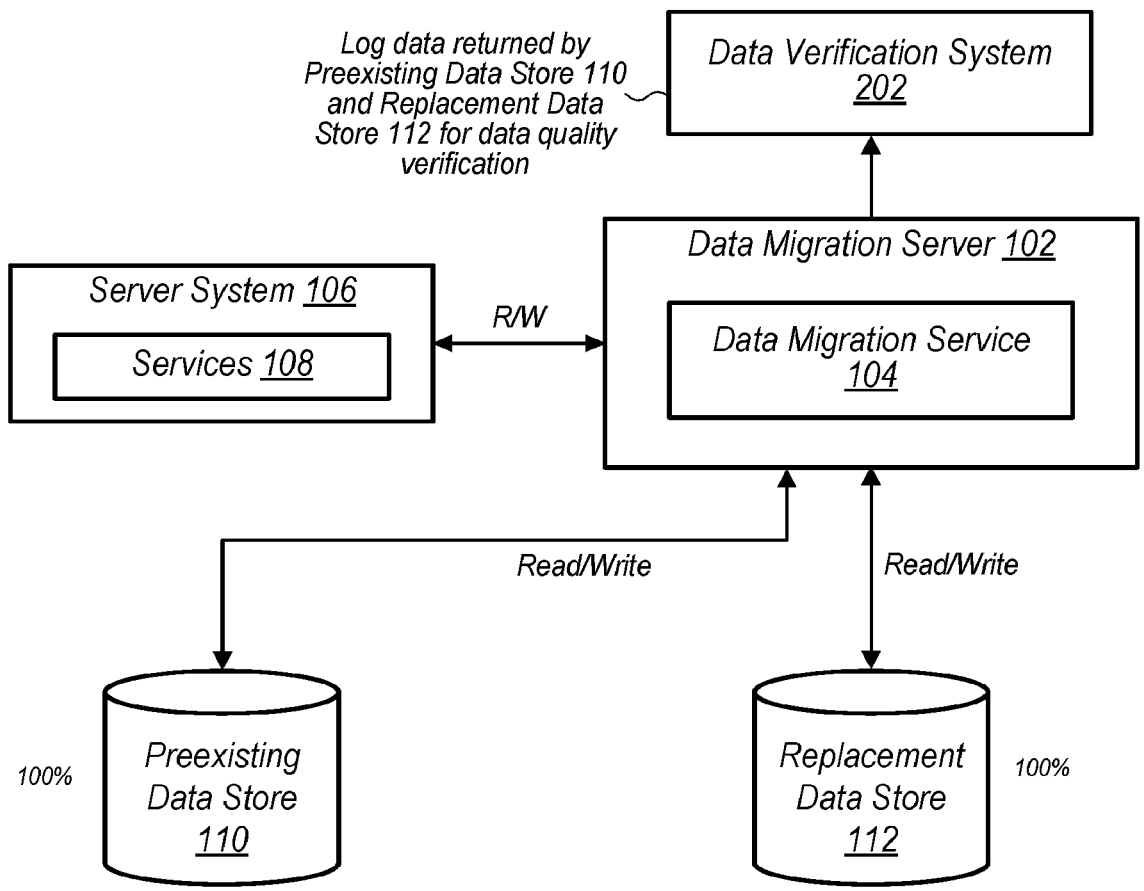

In FIG. 2E, block diagram 240 includes a data verification system 202, which, in various embodiments, is configured to perform data verification operations as part of the transition from preexisting data store 110 to replacement data store 112. In the embodiment of FIG. 2E, the data migration server 102 has been placed in a dual-read operation mode in which, in response to a read request from one or more of the services 108, the data migration server 102 reads corresponding data entries from both the preexisting data store 110 and the replacement data store 112. Note, however, that in the embodiment of FIG. 2E, the preexisting data store 110 is still used as the primary data store for the various services 108. That is, although data is read from both data stores 110 and 112, it is only the data read from the preexisting data store 110 that is returned to the requesting service 108. Instead, the data read from replacement data store 112 is used for data verification purposes to ensure data quality during the transition process.

In various embodiments, the data migration service 104 is operable to facilitate data verification operations to verify the data read from the replacement data store 112 matches corresponding data read from the preexisting data store 110. Note that, in some embodiments, the data verification operations may be performed by the data migration server 102 itself. In other embodiments, such as the embodiment depicted in FIG. 2E, some or all of the data verification operations may be performed by a separate system, such as data verification system 202. For example, in the depicted embodiment, as data is read from both the preexisting data store 110 and the replacement data store 112 in response to read requests (initiated by one or more of the services 108), that data is provided to the data verification system 202. Although shown as a single entity in FIG. 2E for convenience, note that, in various embodiments, the data verification system 202 may be implemented using a distributed computing framework, such as Apache™ Hadoop to perform large-scale data verification using a number of computing systems. Note, however, that this embodiment is provided merely as an example and is not intended to limit the scope of the present disclosure.

In various embodiments, the data verification system 202 is configured to compare corresponding data entries from the two data stores 110 and 112 to ensure that the data read from the replacement data store 112 matches the data read from the preexisting data store 110. For example, if for a given pair of data entries, the data read from the replacement data store 112 matches the data read from the preexisting data store 110, the data verification system 202 designates that read operation as a successful read operation by the data verification system 202. If, however, the data read from the replacement data store 112 does not match the data read from the preexisting data store 110, the data verification system 202 designates the data read from the preexisting data store 110 as the correct version of the data and generates a failure indication corresponding to the read operation. In various embodiments, the data verification system 202 may store information regarding the data verification operation, such as the number of read operations performed, the number of read operations that failed, identification information for those data entries for which a read operation failed, the percentage of total read operations for a given service 108 (or for all services 108) that failed, etc.

In various embodiments, data verification system 202 is operable to generate a data quality report indicative of the performance of the data verification operations. For example, in some embodiments, the data quality report may indicate the percentage of successful read operations in which the data read from the preexisting data store 110 matched data read from the replacement data store 112. Note, however, that this embodiment is provided merely as an example is not intended to limit the scope of the present disclosure. In other embodiments, data verification system 202 may generate a data quality report that specifies any suitable combination of performance metrics indicative of the data quality of the data stored by replacement data store 112. In various embodiments, the data quality reports may be used to determine whether the data read from the replacement data store 112 is sufficiently accurate to proceed further in the data store transition process. For example, in some embodiments, the disclosed systems may measure the data quality of the data read from replacement data store 112 with reference to a "quality threshold" that indicates a measure to which the data retrieved from the replacement data store 112 matches the data read from the preexisting data store 110. As a non-limiting example, this quality threshold may be expressed, in some embodiments, as a percentage value, such as 90%, 95%, 99%, etc. Note, however, that this embodiment is provided merely as an example and is not intended to limit the scope of the present disclosure. In other embodiments, for example, various other suitable representations of the quality threshold may be used as desired, such as a score range (e.g., 0-1, 1-10, etc.). In various embodiments, as part of the data verification operations, the data verification system 202 may compare the accuracy of the data read from the replacement data store 112 to this quality threshold. In some such embodiments, if the accuracy of the data read from the replacement data store 112 exceeds this quality threshold, the data verification system 202 may send an indication of this to the data migration server 102.

Note that, in some embodiments, the data verification system 202 may delay generating the data quality report until a particular number of corresponding data entries have been read from the preexisting data store 110 and the replacement store 112. For example, in some such embodiments, the data migration server 102 may perform a large number (e.g. tens of millions) of read operations for the services 108 in a given day. In some such embodiments, the data verification system 202 may perform the data verification operations and generate the data quality report once the number of data entry pairs being analyzed exceeds a minimum value of transactions (e.g., 20 million, 100 million, etc.). Deferring the data quality report until this minimum number of transactions has been logged may improve the quality of the data verification operations by ensuring that a sufficiently large sample size has been obtained, according to some embodiments.

Further note that, in some embodiments, when a given data entry read from the replacement data store 112 does not match the corresponding data entry read from the preexisting data store 110, data migration server 102 may take one or more corrective actions. For example, to ensure coherency between the two data stores, the data migration server 102 may update the relevant data entry in replacement data store 112 to match the corresponding value that was read from the preexisting data store 110. In this way, the disclosed systems and methods may provide techniques for both verifying the data in the replacement data store 112 and correcting that data in the event that an inconsistency is detected. Additionally, note that, in some embodiments, the disclosed systems and methods may continue to perform data verification operations even after transitioning from the preexisting data store 110 to the replacement data store 112 as the primary data store. For example, after making this transition but prior to decommissioning the preexisting data store 110, data migration server 102 (with data verification system 202, in some embodiments) may continue to perform data verification for some predetermined time interval (e.g., one week, one month, etc.) or usage interval (e.g., 10 million data read operations, etc.).

Figure 2F:
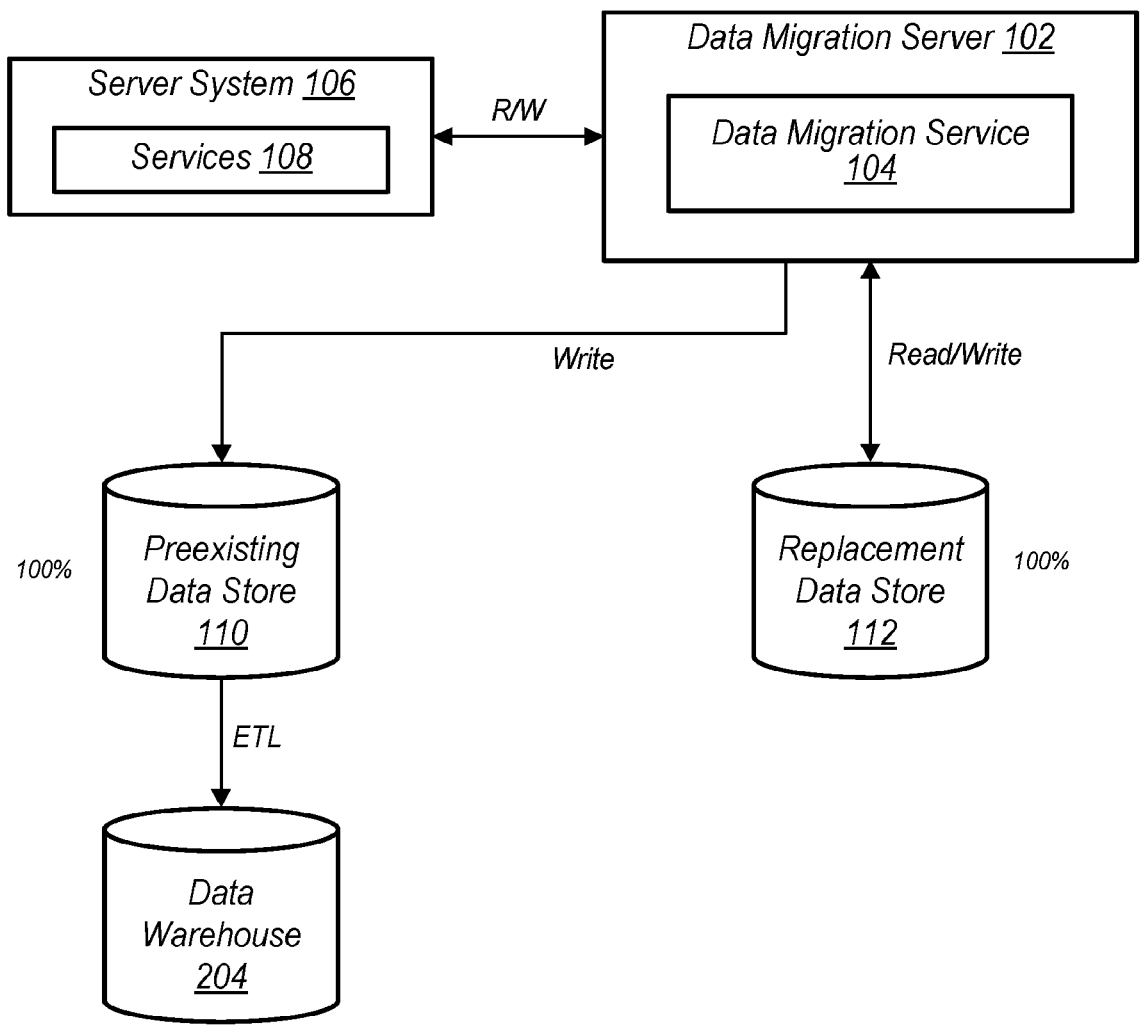
Figure 2G:
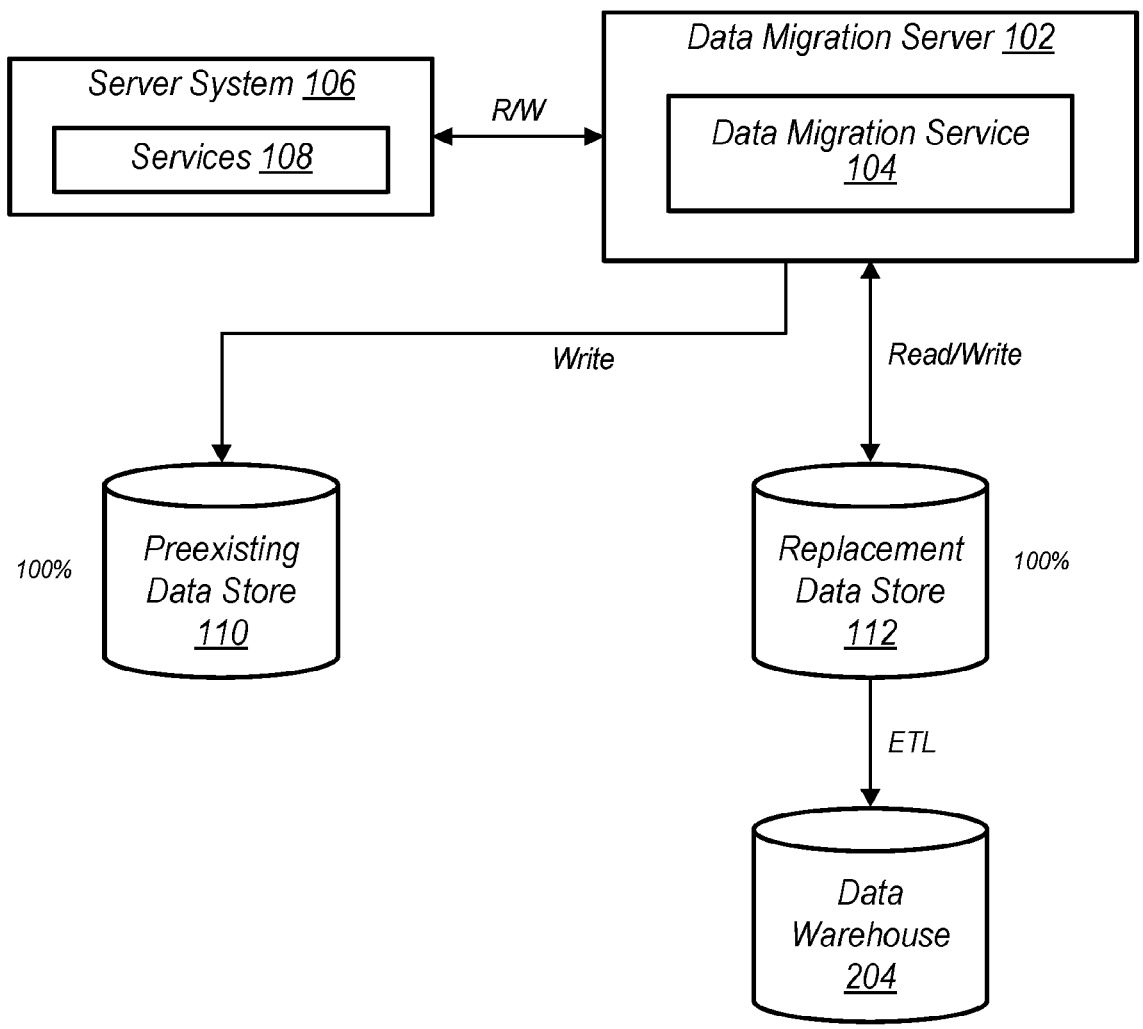

In addition to transitioning from the preexisting data store 110 to the replacement data store 112 as the primary data store for the services 108, various disclosed embodiments may also migrate one or more other systems (e.g., "downstream" systems, such as extract, transform, load ("ETL") operations) to the replacement data store 112. Referring to FIGS. 2F-2G, for example, block diagrams 250 and 260 depict stages in the process of transitioning ETL operations from the preexisting data store 110 to the replacement data store 112. As will be appreciated by one skilled in the art, ETL refers generally to the process of copying data from one or more data stores (such as the preexisting data store 110 or the replacement data store 112) to another, such as data warehouse 204 of FIGS. 2F-2G. As one non-limiting example, data warehouse 204 may be implemented using Oracle Integration Server, according to some embodiments. For example, as indicated in FIG. 2F, prior to transitioning from preexisting data store 110 to replacement data store 112, ETL operations may be performed (e.g., periodically) to extract (e.g., read) the data stored data in preexisting data store 110, perform one or more transformations on the extracted data (e.g., adjusting its format or structure), and load (e.g., write) it into the data warehouse 204. In various embodiments, the disclosed systems and methods may additionally transition from the preexisting data store 110 to the replacement data store 112 as the source of data for these ETL operations such that, after the transition, data is extracted, transformed, and loaded from the replacement data store 112 to the data warehouse 204, as indicated in FIG. 2G. For instance, in some embodiments, the ETL service, as well as various other services in the system 100, may be adjusted to point to the replacement data store 112, rather than the preexisting data store 110, as the data source for their respective operations. ETL operations may be performed for various reasons, according to different embodiments. In some instances, for example, ETL operations may be performed to integrate data from multiple segments of an organization so that data for the organization as a whole (or simply a larger segment of the organization) may be standardized and consolidated in a central storage area, rather than in potentially many separate data stores. For example, though not shown in FIG. 2F or 2G, data warehouse 204 may be used to consolidate data from various other aspect of the system 100 in which the services 108 are provided.

In various embodiments, once the data stored in, and read from, the replacement data store 112 has been verified and is deemed sufficiently accurate, various embodiments include switching from the preexisting data store 110 to the replacement data store 112 as the primary data store to service data-access requests from the services 108. For example, as described in more detail below with reference to FIG. 3, configuration settings associated with the data migration server 102 may be adjusted to designate the replacement data store 112 as the primary data store such that, once this designation is made, the data migration server 102 returns data read from the replacement data store 112 to the requesting services 108.

Note that, in some embodiments, this change in designation as the primary data store may be performed either with or without direct user interaction, according to various embodiments. For example, in some embodiments, data migration server 102 is configured to receive data quality reports from the data verification system 202 and, based on the quality of the data stored in the replacement data store 112, may autonomously determine whether to designate the replacement data store 112 as the primary data store. In other embodiments, however, this change in designation may be performed in response to user input. For example, in some embodiments, the data quality report generated by the data verification system 202 may be analyzed by a human operator (e.g., a system administrator) who may determine whether to change the designation of the primary data store. In some such embodiments, the user may change the designation by accessing and modifying the configuration data included in (or stored in a storage area accessible to) the data migration server 102.

In some embodiments, data migration server 102 may continue to operate in dual-read or dual-write operation modes for a period of time after the replacement data store 112 has been designated as the primary data store for the services 108. For example, in some embodiments, data migration server 102 may continue to write data to and read data from both the preexisting data store 110 and the replacement data store 112 for a particular time period (e.g., one day, one week, one month, etc.) to perform further data verification operations to ensure continued data quality in the period following the transition from the preexisting data store 110 to the replacement data store 112. In some embodiments, this monitoring process may be performed either by the data migration server 102 itself or, as described above with reference to FIG. 2E, using the data verification system 202, according to various embodiments. Further note that, in some embodiments, the disclosed systems and methods may additionally include monitoring the performance of one or more other services that utilize the replacement data store 112, such as the ETL operations discussed above, to ensure that the switch from the preexisting data store 110 to the replacement data store 112 has not negatively impacted the performance of those services.

Figure 2H:
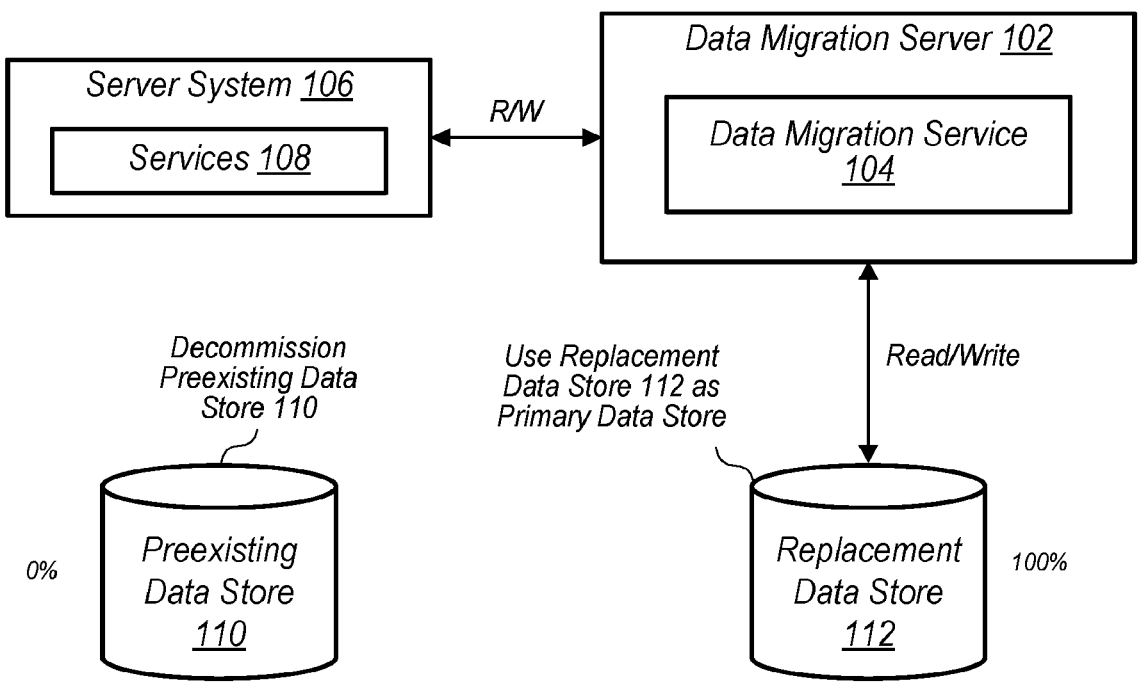

After the replacement data store 112 has been designated as the primary data store for the services 108, various disclosed embodiments include decommissioning the preexisting data store 110, as depicted in FIG. 2H. Once decommissioned, the preexisting data store 110 is no longer used to service requests for the services 108. In various embodiments, decommissioning the preexisting data store 110 includes disabling both the dual-read and the dual-write operation modes for the data migration server 102 such that the data migration server 102 ceases writing data to and reading data from the preexisting data store 110. Further, in some embodiments, decommissioning the preexisting data store 110 may include disconnecting it from the system 100 entirely such that it is no longer used, or repurposing it to serve as a data store for a different use.

Figure 3:
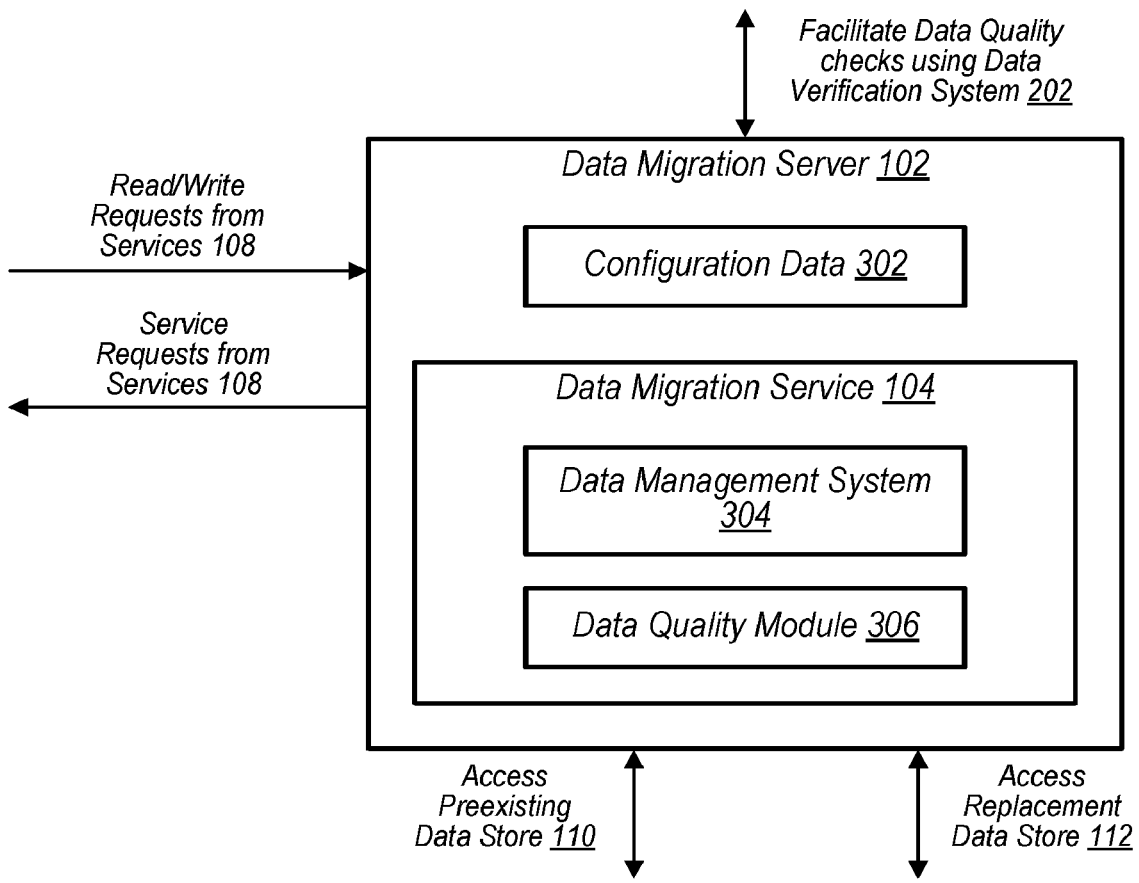
FIG. 3 is a block diagram illustrating an example data migration server, according to some embodiments.

Referring now to FIG. 3, a block diagram illustrating an example data migration server 102 is depicted, according to some embodiments. In various embodiments, the data migration server 102 is operable to facilitate the transition from the preexisting data store 110 to the replacement data store 112 as the primary data store for the various services 108. For example, in the depicted embodiment, data migration server 102 includes data migration service 104, which, in various embodiments, is operable to service various data-access requests from the services 108 while facilitating the transition from the preexisting data store 110 to the replacement data store 112.

In the depicted embodiment, data migration service 104 includes data management system 304. In various embodiments, data management system 304 is operable to service read and write requests from the various services 108 by accessing data stored in the preexisting data store 110 and the replacement data store 112. For example, depending on the nature of the data-access request from the services 108, the data management system 304 may create, retrieve, update, or delete data entries in the preexisting data store 110 and replacement data store 112. In some embodiments, data management system 304 may be implemented as a database management system, such as the Oracle™ RDBMS. Note, however, that this embodiment is provided merely as an example and is not intended to limit the scope of the present disclosure. In other embodiments, for example, the data management system 304 may be implemented using various suitable data management services or techniques.

In various embodiments, the manner in which the data management system 304 operates may vary based on the operating mode of the data migration server 102. For example, as described above with reference to FIG. 2B, during some stages in the process of transitioning from the preexisting data store 110 to the replacement data store 112, data migration server 102 may be configured to read data from and write data to the preexisting data store 110 as the primary data store, and not read or write data to the replacement data store 112. During other stages in the transition process, however, such as that shown in FIG. 2D, the data migration server uses a dual-write operation mode in which it writes data to both the preexisting data store 110 and the replacement data store 112, while reading data solely from the preexisting data store 110. In various embodiments, the different operation modes for the data migration server 102 may be enabled and disabled by adjusting the status of one or more configuration settings. For example, as shown in FIG. 3, data migration server includes (or has access to) configuration data 302, which the data migration server 102 may use to transition between operation modes. As one non-limiting example, the operation mode of the data migration server can be represented as a 4-bit binary sequence in which one bit field is indicative of a single-read operation mode, one bit field is indicative of a single-write operation mode, one bit field is indicative of a dual-read operation mode, and the final bit field is indicative of a dual-write operation mode. This example 4-bit sequence may be explained more easily with reference to Table 1:

TABLE 1

| Bit Field | | | | Explanation |
|---|---|---|---|---|
| 0 | x | x | x | Read from preexisting data store 110 |
| 1 | x | x | x | Read from replacement data store 112 |
| x | 0 | x | x | Write to preexisting data store 110 |
| x | 1 | x | x | Write to replacement data store 112 |
| x | x | 0 | x | Dual-read off |
| x | x | 1 | x | Dual-read on |
| x | x | x | 0 | Dual-write off |
| x | x | x | 1 | Dual-write on |

Note that, in the table above, a given row contains a value for only one bit field, with the other bit fields being populated with the "x" symbol. This notation is used to explain the meaning of a given bit field (the bit field for which there is a value provided) without reference to the other bit fields (the bit fields for which there is an "x"). Using this example encoding scheme, the configuration settings for the various operation modes of the data migration server 102 may be expressed in configuration data 302. As a non-limiting example, various operation modes of the data migration server 102 may be expressed as provided in Table 2:

TABLE 2

| Bit Pattern | | | | Explanation |
|---|---|---|---|---|
| 0 | 0 | 0 | 0 | Read from and write to preexisting data store 110 (Shown in FIG. 2B) |
| 0 | 0 | 0 | 1 | Write to both preexisting data store 110 and replacement data store 112 (e.g., dual-write) Read from preexisting data store 110 (Shown in FIG. 2D) |
| 0 | 0 | 1 | 1 | Dual-write to both preexisting data store 110 and replacement data store 112 Dual-read from both preexisting data store 110 and replacement data store 112 Use preexisting data store 110 as the primary data store (Shown in FIG. 2E) |
| 1 | 1 | 1 | 1 | Dual-write to both preexisting data store 110 and replacement data store 112 Dual-read from both preexisting data store 110 and replacement data store 112 Use replacement data store 112 as the primary data store |
| 1 | 1 | 0 | 0 | Read from and write to replacement data store 112 Use replacement data store 112 as the primary data store (Shown in FIG. 2H) |

Note that, in some embodiments, the bit patterns used to indicate the operation mode of the data migration server 102 may further include a bit field used to specifically designate which of the data stores, preexisting data store 110 or replacement data store 112, is to be used as the primary data store for the various services 108. In other embodiments, such as the embodiment illustrated above, the designation of which data store is to be used as the primary data store may be implicitly expressed through the value of one or more fields in the bit pattern. In the example bit patterns shown above, the designation of which data store is the primary data store is implicitly expressed through the "read from" and "write to" bit fields. For example, in the first bit pattern shown above ("0000"), it is implicit from the "read from" and "write to" bit fields that the preexisting data store 110 is designated as the primary data store since data is read from and written to the preexisting data store 110 and not the replacement data store 112. Similarly, in the fifth bit pattern shown above ("1100"), it is implicit from the "read from" and "write to" bit fields that the replacement data store 112 is designated as the primary data store as data is read from and written to the replacement data store and not the preexisting data store 110. Further still, in the fourth bit pattern shown above ("1111"), it is implicit from the "read from" and "write to" bit fields that the replacement data store 112 is designated as the primary data store since, although data is read from and written to both data stores 110 and 112, it is the data read from the replacement data store 112 that is returned to the requesting services 108. As noted above, however, in various embodiments the primary data store may simply be designated using a dedicated bit field (e.g., a "flag") or using any other suitable technique. Further note that the above embodiment is provided merely as an example and is not intended to limit the scope of the present disclosure. As will be appreciated by one of skill in the art with the benefit of this disclosure, in other embodiments, the operation mode for the data migration server 102 may be expressed and modified using any of various suitable techniques.

As shown in FIG. 3, data migration server 102 further includes data quality module 306. In various embodiments, data quality module 306 is operable to facilitate data verification operations to verify the data read from the replacement data store 112. For example, as discussed above with reference to FIG. 2E, in some embodiments the data quality module 306 is operable to facilitate data verification operations by providing, to a data verification system 202, corresponding data entries read from both the preexisting data store 110 and the replacement data store 112 so that the data verification system 202 may compare these corresponding entries. This process may be continued over a predetermined period (e.g., one day, one week, 10 million read data entries, or any other suitable time or usage period) so that the data verification system 202 may assess the data quality of the data stored in the replacement data store 112 over a sufficiently large sample size. The data verification system 202 may then generate and provide a data quality report indicating whether the data read from the replacement data store 112 during a dual-read operation mode exceeds a quality threshold. Note, however, that in some embodiments, the data quality module 306 of data migration server 102 may be operable to perform some or all of the data verification operations described with reference to the data verification system 202. For example, in some embodiments, the data quality module 306 is operable to compare corresponding entries read from the preexisting data store 110 and the replacement data store 112 and generate a data quality report indicating whether the data read from the replacement data store 112 exceeds the quality threshold.

Figure 4:
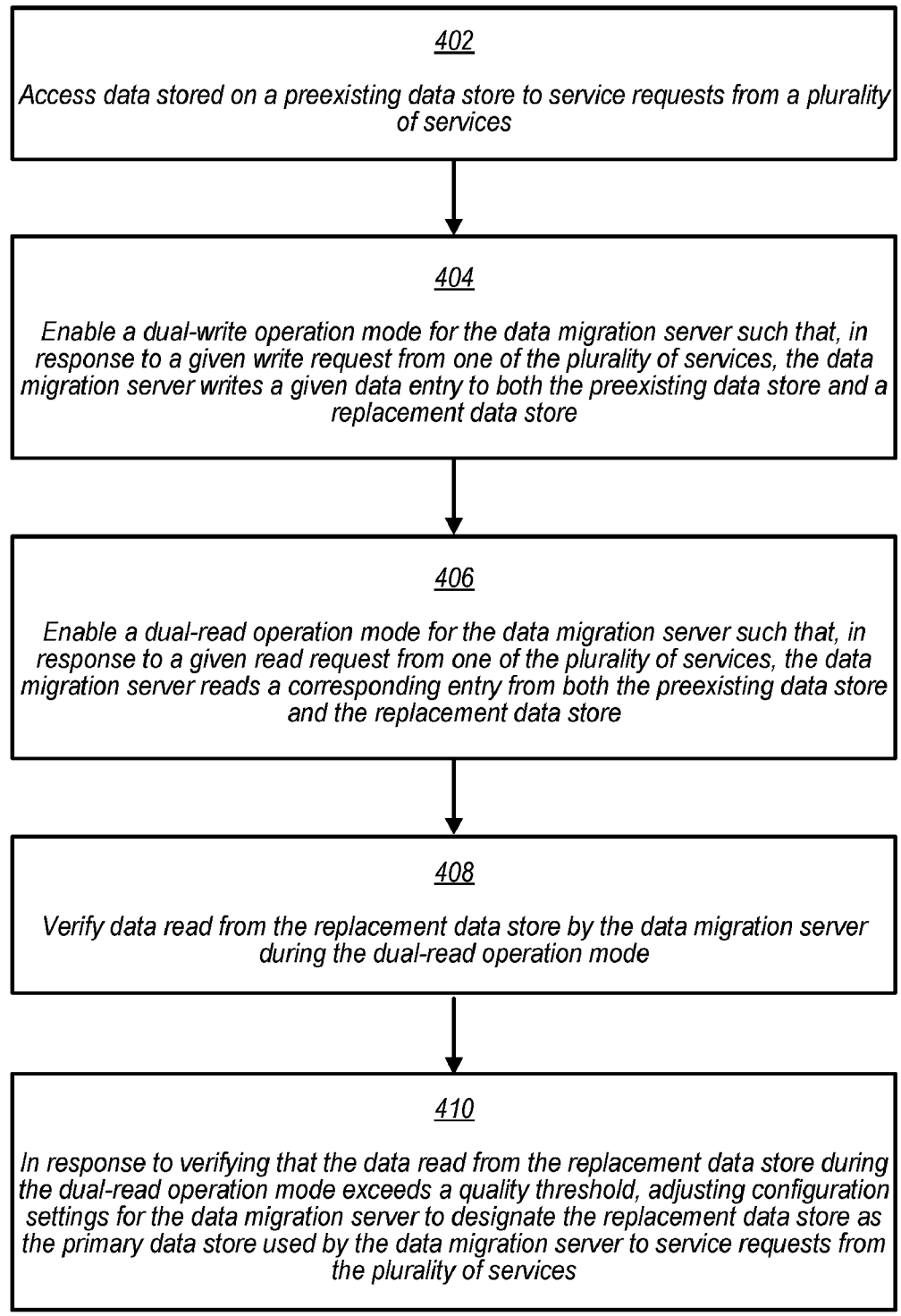
FIG. 4 is a flow diagram illustrating an example method for transitioning between data stores using a data migration server, according to some embodiments.

Turning now to FIG. 4, a flow diagram illustrating an example method 400 for transitioning between data stores using a data migration server is depicted, according to some embodiments. In various embodiments, method 400 may be performed by data migration server 102 of FIG. 1 to transition from preexisting data store 110 to replacement data store 112 as the primary data store for various ones of the services 108A-N. For example, data migration server 102 may include (or have access to) a non-transitory, computer-readable medium having program instructions stored thereon that are executable by the data migration server to cause the operations described with reference to FIG. 4. In FIG. 4, method 400 includes elements 402-410. While these elements are shown in a particular order for ease of understanding, other orders may be used. In various embodiments, some of the method elements may be performed concurrently, in a different order than shown, or may be omitted. Additional method elements may also be performed as desired.

At 402, in the illustrated embodiment, the data migration server 102 accesses data stored on a preexisting data store to service requests from a plurality of services. For example, as shown in FIG. 2B, data migration server 102 may act as an intermediary between the services 108 being hosted by one or more server systems 106 and the preexisting data store 110, which is being used as the primary data store for the services 108. In such embodiments, when a given service 108 needs to perform a data-access operation, it may send a read or write request to the data migration server 102, which may then perform the appropriate data-access operation using the preexisting data store 110.

At 404, in the illustrated embodiment, a dual-write operation mode is enabled for the data migration server such that, in response to a given write request from one of the plurality of services, the data migration server writes a given data entry to both the preexisting data store and a replacement data store that is configured to store data used by the plurality of services. For example, while in this dual-write operation mode, the data migration server 102 may perform write operations to both the preexisting data store 110 and the replacement data store 112, as depicted in FIG. 2D. As noted above, in some embodiments, the replacement data store 112 is a sharded database system. Further, as discussed above with reference to FIG. 3, the data migration server 102 may transition between operation modes using various suitable techniques. For example, in some embodiments, data migration service 104 may include (or have access to) configuration data 302, which may be used to specify and modify a current operation mode for the data migration server 102.

At 406, in the illustrated embodiment, a dual-read operation mode is enabled for the data migration server such that, in response to a given read request from one of the plurality of services, the data migration server reads a corresponding entry from both the preexisting data store and the replacement data store. Note that, in various embodiments, method 400 may include replicating data from the preexisting data store 110 to the replacement data store 112 prior to enabling the dual-read operation mode for the data migration server 102. Further note that, in some embodiments, it is possible that data read from the replacement data store 112 will not match the corresponding data read from the preexisting data store 110 for a given read request. In response to a determination that a data entry read from the replacement data store 112, while operating in the dual-read operation mode, does not match a corresponding data entry read from the preexisting data store 110, method 400 may include returning the data entry read from the preexisting data store 110 to the requesting service 108.

At 408, in the illustrated embodiment, method 400 includes verifying data read from the replacement data store by the data migration server during the dual-read operation mode. In some embodiments, verifying the data read from the replacement data store may include reading corresponding data entries from both the preexisting data store 110 and the replacement data store 112, comparing the corresponding data entries to determine whether a given data entry read from the preexisting data store 110 matches a corresponding data entry read from the replacement data store 112, and generating a data quality report based on the comparison that indicates whether the data read from the replacement data store 112 during the dual-read operation mode exceeds a quality threshold. In some embodiments, some or all of the data verification operations may be performed by the data migration server 102 itself. In other embodiments, however, some or all of the data verification operations may be performed by a data verification system 202 accessible to the data migration server 102. In some such embodiments, element 408 includes providing, to the data verification system 202, a plurality of corresponding data entries read from both the preexisting data store 110 and the replacement data store 112. Once the data verification system 202 has performed various verification operations it may send, to the data migration server 102, a data quality report, as noted above.

At 410, in the illustrated embodiment, method 400 includes, in response to verifying that the data read from the replacement data store during the dual-read operation mode exceeds a quality threshold, adjusting configuration settings for the data migration server to designate the replacement data store as the primary data store used by the data migration server to service requests from the plurality of services. Once the replacement data store 112 is designated as the primary data store, the data migration server 102 may return data read from the replacement data store 112 in response to read requests from requesting services 108. Note that, in some embodiments, transitions between one or more of the operation modes of the data migration server 102 may be performed automatically by the data migration server 102. For example, in some embodiments, the data migration server 102 may receive a data quality report from the data verification system 202 indicating that the data read from the replacement data store 112 exceeds the quality threshold and, based on this, may automatically transition to a subsequent operation mode in which the replacement data store 112 is designated as the primary data store. In other embodiments, however, transitions between one or more of the operation modes of the data migration server 102 may be made in response to user input. For example, in some embodiments, a human operator may analyze the data quality report provided by the data verification system 202 and, based on the report, may provide input to adjust the configuration settings for the data migration server 102 to change its operation mode.

In various embodiments, subsequent to designating the replacement data store 112 as the primary data store, method 400 may include decommissioning the preexisting data store 110 such that, once decommissioned, the preexisting data store 110 is no longer used to service requests from the plurality of services. In some embodiments, decommissioning the preexisting data store includes disabling the dual-write and dual-read operation modes for the data migration server 102 such that it ceases to write data to or read data from the preexisting data store 110.

Note that, in some embodiment, data may be copied from the preexisting data store 110 to the replacement data store 112 through use of ETL operations. For example, in some such embodiments, the disclosed systems and methods may include copying data from a data warehouse (e.g., data warehouse 204 of FIG. 2F) to the replacement data store 112 via the replacement data store 110. The data warehouse may then enter a dual-write operation mode in which it writes data to both the preexisting data store 110 and the replacement data store 112. In various embodiments, the data warehouse may then migrate the data traffic to the replacement data store 112 and disable the dual-write operation mode, allowing the preexisting data store 110 to be decommissioned.

Further, in some embodiments, the disclosed techniques may include transitioning from a preexisting data store 110 to a replacement data store 112 using a SaaS-based e-commerce application, such as Oracle™ Commerce Cloud ("OCC"). For example, in embodiments in which one or more of the services 108 use OCC to perform data-access operations, the disclosed data store transition techniques may begin by replicating data from the preexisting data store 110 to the replacement data store 112 (e.g., using Oracle GoldenGate replication). Then, in some embodiments, data-access traffic may be migrated to the replacement data store 112 by redirecting data-access calls from a preexisting "legacy" OCC instance, associated with the preexisting data store 110, to a replacement OCC instance associated with the replacement data store 112. Additionally, in various embodiments, the data replication from the preexisting data store 110 to the replacement data store 112 may be ceased at this stage. As data is now being written to the replacement data store 112 by the replacement OCC, however, data replication may be initiated in the other direction to replicate data from the replacement data store 112 to the preexisting data store 110, according to various embodiments. Further, some embodiments may include transitioning ETL operations from the preexisting data store 110 to the replacement data store 112, as discussed in more detail above with reference to FIGS. 2F-2G. Additionally, rather than routing data-access requests through the preexisting OCC instance to the replacement OCC instance, some embodiments may then migrate the data-access requests, from the various services 108, directly to the replacement OCC instance. Note that, in some such embodiments, the disclosed systems and methods may include performing data verification operations, as described above with reference to FIG. 2E, during this data store transition process. Once it is determined that the data quality of the replacement data store 112 exceeds a particular quality threshold, the backwards replication process to the preexisting data store 110 may be ceased and the preexisting data store 110, along with its associated OCC instance, may be decommissioned.

Example Computer System

Figure 5:
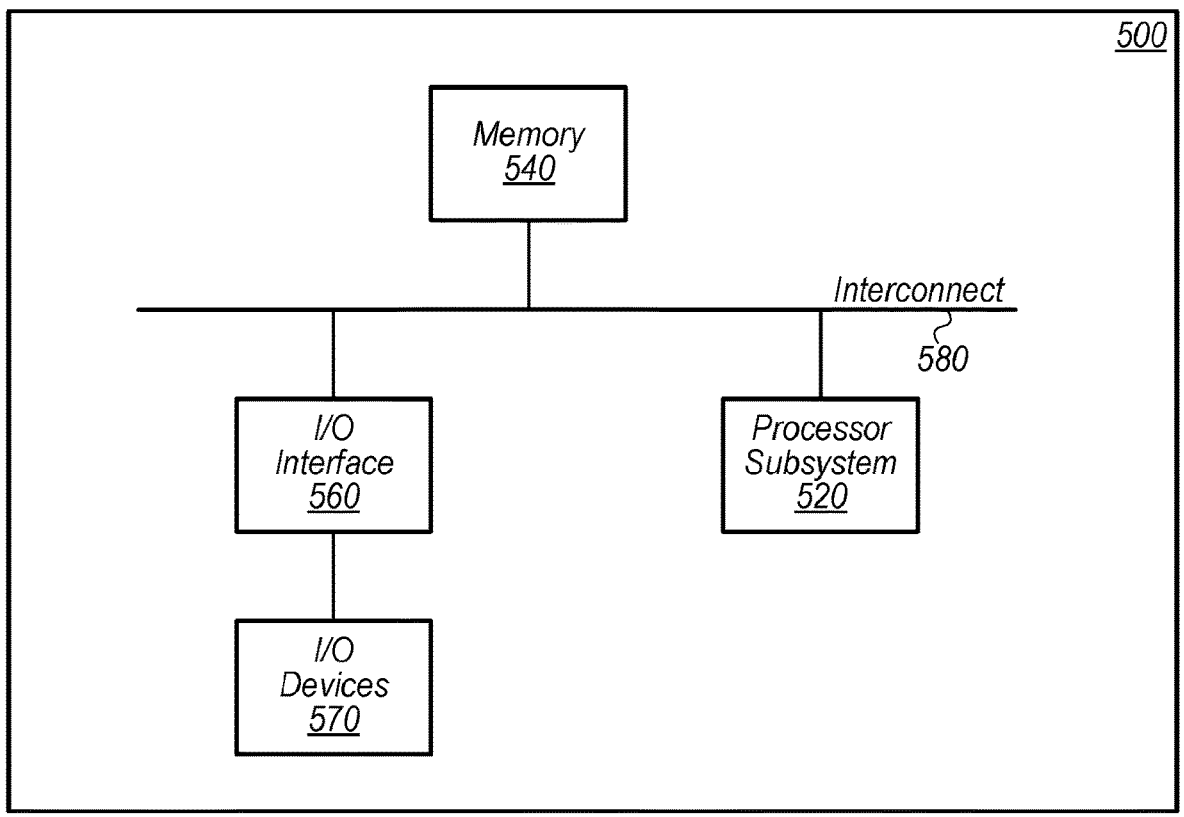
FIG. 5 is a block diagram illustrating an example computer system, according to some embodiments.

Referring now to FIG. 5, a block diagram of an example computer system 500 is depicted, which may implement one or more computer systems, such as a computer system used to implement data migration server 102 of FIG. 1, according to various embodiments. Computer system 500 includes a processor subsystem 520 that is coupled to a system memory 540 and I/O interfaces(s) 560 via an interconnect 580 (e.g., a system bus). I/O interface(s) 560 is coupled to one or more I/O devices 570. Computer system 500 may be any of various types of devices, including, but not limited to, a server computer system, personal computer system, desktop computer, laptop or notebook computer, mainframe computer system, server computer system operating in a data-center facility, tablet computer, handheld computer, workstation, network computer, etc. Although a single computer system 500 is shown in FIG. 5 for convenience, computer system 500 may also be implemented as two or more computer systems operating together.

Processor subsystem 520 may include one or more processors or processing units. In various embodiments of computer system 500, multiple instances of processor subsystem 520 may be coupled to interconnect 580. In various embodiments, processor subsystem 520 (or each processor unit within 520) may contain a cache or other form of on-board memory.

System memory 540 is usable to store program instructions executable by processor subsystem 520 to cause system 500 perform various operations described herein. System memory 540 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 500 is not limited to primary storage such as system memory 540. Rather, computer system 500 may also include other forms of storage such as cache memory in processor subsystem 520 and secondary storage on I/O devices 570 (e.g., a hard drive, storage array, etc.). In some embodiments, these other forms of storage may also store program instructions executable by processor subsystem 520.

I/O interfaces 560 may be any of various types of interfaces configured to couple to and communicate with other devices, according to various embodiments. In one embodiment, I/O interface 560 is a bridge chip (e.g., Southbridge) from a front-side to one or more back-side buses. I/O interfaces 560 may be coupled to one or more I/O devices 570 via one or more corresponding buses or other interfaces. Examples of I/O devices 570 include storage devices (hard drive, optical drive, removable flash drive, storage array, SAN, or their associated controller), network interface devices (e.g., to a local or wide-area network), or other devices (e.g., graphics, user interface devices, etc.). In one embodiment, I/O devices 570 includes a network interface device (e.g., configured to communicate over WiFi, Bluetooth, Ethernet, etc.), and computer system 500 is coupled to a network via the network interface device.

Although the embodiments disclosed herein are susceptible to various modifications and alternative forms, specific embodiments are shown by way of example in the figures and are described herein in detail. It should be understood, however, that figures and detailed description thereto are not intended to limit the scope of the claims to the particular forms disclosed. Instead, this application is intended to cover all modifications, equivalents, and alternatives falling within the spirit and scope of the disclosure of the present application as defined by the appended claims. The headings used herein are for organizational purposes only and are not meant to be used to limit the scope of the description.

This disclosure includes references to "one embodiment," "a particular embodiment," "some embodiments," "various embodiments," "an embodiment," etc. The appearances of these or similar phrases do not necessarily refer to the same embodiment. Particular features, structures, or characteristics may be combined in any suitable manner consistent with this disclosure.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z).

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a," "an," and "the" include singular and plural referents unless the context clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "memory device configured to store data" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

In this disclosure, various "modules" operable to perform designated functions are shown in the figures and described in detail above (e.g., data migration service 104, data quality module 306, etc.). As used herein, the term "module" refers to circuitry configured to perform specified operations or to physical, non-transitory computer-readable media that stores information (e.g., program instructions) that instructs other circuitry (e.g., a processor) to perform specified operations. Such circuitry may be implemented in multiple ways, including as a hardwired circuit or as a memory having program instructions stored therein that are executable by one or more processors to perform the operations. The hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority hereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for implementing data migration processes, the method comprising:
   receiving, by a server system a transaction request from a first service of a plurality of services, the server system facilitating data access for the plurality of services via a preexisting data store;
   determining, by the server system, that the transaction request is associated with a data read to data stored by the preexisting data store;
   determining, by the server system, that data from the preexisting data store is being migrated to a replacement data store;
   responsive to determination that the data from the preexisting data store is being migrated to the replacement data store, reading requested read data for the data read using a dual-read operation mode by reading respective data entries from both the preexisting data store and the replacement data store;
   verifying data read from the replacement data store by comparing the respective data entries to determine whether a given data entry read from the preexisting data store matches a given corresponding data entry read from the replacement data store; and
   in response to verifying that the data read from the replacement data store during the dual-read operation mode exceeds a quality threshold, designating the replacement data store as the primary data store used by the server system to service requests from the plurality of services.

2. The method of claim 1, further comprising:
   generating a data quality report based on the comparing that indicates whether the data read from the replacement data store during the dual-read operation mode exceeds the quality threshold.

3. The method of claim 1, further comprising:
   determining, by the server system, that the transaction request is further associated with a data write to data stored by the preexisting data store; and
   further responsive to determination that the data from the preexisting data store is being migrated to the replacement data store, writing requested write data for the data write using a dual-write operation mode by writing a given data entry to both the preexisting data store and the replacement data store.

4. The method of claim 1, wherein the preexisting data store is designated as a primary data store to service a plurality of requests.

5. The method of claim 1, further comprising:
   determining that the data migration process is completed;
   responsive to determining that the data migration process is completed, designating the replacement data store as the primary data store; and
   responsive to designating the replacement data store as the primary data store, decommissioning the preexisting data store such that, once decommissioned, the preexisting data store is no longer used to service requests from the plurality of services.

6. The method of claim 1, further comprising:
   determining that the data migration process is completed;
   responsive to determining that the data migration process is completed, designating the replacement data store as the primary data store; and
   responsive to designating the replacement data store as the primary data store, disabling the dual-read operation modes for the server system such that the server system ceases at least reading data from the preexisting data store.

7. The method of claim 1, wherein the verifying the data read from the replacement data store is performed by a data verification system accessible to the server system, wherein the method further comprises receiving, by the server system from the data verification system, a report indicating whether the data read from the replacement data store during the dual-read operation mode exceeds the quality threshold.

8. The method of claim 1, further comprising:
   prior to using the dual-read operation mode for the server system, replicating data from the preexisting data store to the replacement data store as part of the migration of the data of the preexisting data store to the replacement data store.

9. A data migration server, comprising:
   at least one processor; and
   a non-transitory, computer-readable medium having instructions stored thereon that are executable by the at least one processor to cause the data migration server to:
   initiate a data migration process to migrate data between a preexisting data store and a replacement data store, the preexisting data store designated as a primary data store to provide data reads and writes to a plurality of transaction requests for a plurality of services;

receive, by a server system a transaction request from a first service of a plurality of services, the server system facilitating data access to the plurality of services via a preexisting data store;

determine, by the server system, that the transaction request is associated with a data read to data stored by the preexisting data store;

read requested read data for the data read using a dual-read operation mode by reading respective data entries from both the preexisting data store and the replacement data store;

verify data read from the replacement data store by comparing the respective data entries to determine whether a given data entry read from the preexisting data store matches a given corresponding data entry read from the replacement data store; and determine, based on verifying that the data read from the replacement data store during the dual-read operation mode, whether to designate the replacement data store as the primary data store used by the data migration server to service at least some requests from the plurality of services.

10. The data migration server of claim 9, wherein the instructions are further executable to cause the data migration server to, generate a data quality report based on the comparing that indicates whether the data read from the replacement data store during the dual-read operation mode exceeds a quality threshold.

11. The data migration server of claim 9, wherein the instructions are further executable to cause the data migration server to, determine, by the server system, that the transaction request is further associated with a data write to data stored by the preexisting data store; and further responsive to determination that the data from the preexisting data store is being migrated to the replacement data store, write requested write data for the data write using a dual-write operation mode by writing a given data entry to both the preexisting data store and the replacement data store.

12. The data migration server of claim 9, wherein the preexisting data store is designated as a primary data store to service a plurality of requests.

13. The data migration server of claim 9, wherein the instructions are further executable to cause the data migration server to determining that the data migration process is completed;

responsive to determining that the data migration process is completed, designating the replacement data store as the primary data store; and responsive to designating the replacement data store as the primary data store, decommissioning the preexisting data store such that, once decommissioned, the preexisting data store is no longer used to service requests from the plurality of services.

14. The data migration server of claim 9, wherein instructions are further executable to cause the data migration server to designate the replacement data store as the primary data store in response to user input.

15. A non-transitory, computer-readable medium having instructions stored thereon that are executable by a data migration server to perform operations comprising:

initiating a data migration process to migrate data between a preexisting data store and a replacement data store, the preexisting data store designated as a primary data store to provide data reads and writes to a plurality of transaction requests for a plurality of services;

receiving a transaction request from a first service of a plurality of services, the data migration server facilitating data access to the plurality of services via a preexisting data store;

determining that the transaction request is associated with a data read to data stored by the preexisting data store;

reading requested read data for the data read using a dual-read operation mode by reading respective data entries from both the preexisting data store and the replacement data store;

verifying data read from the replacement data store by comparing the respective data entries to determine whether a given data entry read from the preexisting data store matches a given corresponding data entry read from the replacement data store; and determining, based on verifying that the data read from the replacement data store during the dual-read operation mode, whether to designate the replacement data store as the primary data store used by the data migration server to service at least some requests from the plurality of services.

16. The non-transitory, computer-readable medium of claim 15, wherein the operations further comprise:

generating a data quality report based on the comparing that indicates whether the data read from the replacement data store during the dual-read operation mode exceeds a quality threshold.

17. The non-transitory, computer-readable medium of claim 15, wherein the operations further comprise:

determining that the transaction request is further associated with a data write to data stored by the preexisting data store; and further responsive to determination that the data from the preexisting data store is being migrated to the replacement data store, writing requested write data for the data write using a dual-write operation mode by writing a given data entry to both the preexisting data store and the replacement data store.

18. The non-transitory, computer-readable medium of claim 15, wherein the preexisting data store is designated as a primary data store to service a plurality of requests.

19. The non-transitory, computer-readable medium of claim 15, wherein the operations further comprise:

determining that the data migration process is completed;

responsive to determining that the data migration process is completed, designating the replacement data store as the primary data store; and responsive to designating the replacement data store as the primary data store, decommissioning the preexisting data store such that, once decommissioned, the preexisting data store is no longer used to service requests from the plurality of services.

20. The non-transitory, computer-readable medium of claim 15, wherein the data migration process comprises, prior to using the dual-read operation mode for the data migration server, replicating data from the preexisting data store to the replacement data store.

* * * * *